Figure 1:
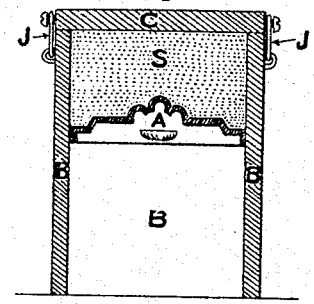

No. 797,553. PATENTED AUG. 22, 1905.
W. P. BUTLER.
PROCESS OF MAKING ARTIFICIAL STONE.
APPLICATION FILED DEC. 13, 1904.

Witnesses:
M. J. Scott
John T. Baxter

Inventor:
Walter P. Butler.

UNITED STATES PATENT OFFICE.

WALTER P. BUTLER, OF MINNEAPOLIS, MINNESOTA

PROCESS OF MAKING ARTIFICIAL STONE.

No. 797,553.           Specification of Letters Patent.           Patented Aug. 22, 1905.

Application filed December 13, 1904. Serial No. 236,674.

*To all whom it may concern:*

Be it known that I, WALTER P. BUTLER, a citizen of the United States, residing in Minneapolis, in the county of Hennepin and State of Minnesota, have invented a new and useful Improvement in Processes of Making Artificial-Stone and Building Blocks out of Cement and other Ingredients; and I declare that the object of said improvement is to render the process more expeditious and economical and to greatly improve the quality and appearance of the product and that the following is a specification of my said invention.

This invention relates to certain improvements in the process of manufacturing either hollow or solid artificial-stone blocks from a composition or mixture of cement and aggregates, (such as sand, gravel, and crushed stone,) and relates particularly to the process of casting the blocks out of liquid or semiliquid cement mixture in a mold composed either wholly or in part of sand or other ingredients hereinafter to be mentioned. The practice of the art of artificial-stone making having developed certain defects inherent in former processes, I have in order to overcome said defects been led to the invention of the process hereinafter described.

In order to more fully describe the improvements claimed, it will be necessary briefly to describe the defects in former processes of artificial-stone making which it is the purpose of this invention to correct or eliminate. In a process of casting the blocks out of plastic or liquid cement mixture in a relatively dry sand mold and allowing the sand to absorb the surplus moisture from the wet plastic cement mixture, the cement being allowed to set while in the sand mold, which protects the block from atmospheric changes during the process of setting and hardening, it has been found that common foundry molding-sand is unsuited to the process of casting stone, since its dark loamy color destroys the appearance of the stone. It has been found that pure white silica sand is best suited to cement-stone molding; but owing to the absence of clay or loam in the sand it has been found to be difficult or impossible to cause the grains of sand to adhere, and thus stand up and retain the details of the form of the wooden or metal pattern used to form the mold. It has also been found that the great porosity of the sand causes an excessive absorption of the moisture contained in the cement mixture, and thereby injuriously affects the process of crystallization in the block.

As will be hereinafter described, it is the purpose of this invention to overcome both of the above-described defects.

In a process of casting the cement blocks in a sand mold which is then saturated with a chemical solution for the purpose of assisting in the process of induration or hardening and also of neutralizing the alkaline salts contained in the cement mixture by the absorption of the chemical solution from the sand into the block it has been found that the addition of any chemical solution works injuriously by tending to injure or lessen the strength of the block by decreasing the bond between the particles of the aggregates composing it. It has also been found that no absorption from the sand into the block occurs if the cement mixture of the block was saturated, (as it is when poured into the mold;) also, that an excessive saturation of the block through a like saturation of the sand mold tends to retard and injure the process of setting and hardening. These defects it is the purpose of this invention to correct.

This invention relates to the process of making artificial cement blocks or stones of any form or size, whether hollow, cored-out, webbed, partitioned, or solid, which may be made wholly or in part of a wet or plastic cement mixture and cast in molds wholly or in part made of a molding compound composed of sand, crushed stone, or any simliar granular material mixed with a proper proportion of powdered talc or powdered soapstone or with any other powdered rock or combination thereof having the smooth soapy slippery properties of the two powdered rocks above named.

The process of stone-casting contemplated may be briefly described by reference to the accompanying drawings, which form a part of this specification, and wherein similar letters are used to designate similar parts.

Figure 2:
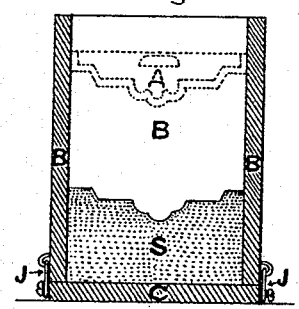
Figure 3:
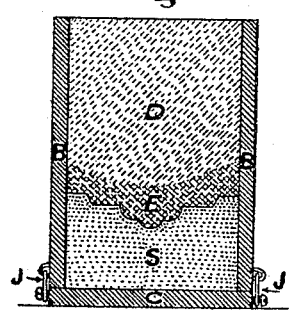

In the said drawings, A represents a pattern or model made to represent the face or design of a stone or block to be cast, said core, pattern, model, or face-plate being made of wood, metal, or other suitable material and is held by clamps or by any other suitable means in proper position within a box or flask B. C is a cover placed over flask and is secured or held thereto by clamps, ks, or other devices J. S is the molding mpound. D is the cement-stone mixture. In Figures 1, 2, 3 is shown a method of casting stones or blocks in a flask or mold-box B, )en at both top and bottom. The pattern r face-plate A, which may be of any form design, having been secured within the isk, the molding compound S is filled into ask and well tamped against the face of ...rn A. The cover C is then fastened to the top of the flask B by hooks J or by any other suitable means in order to hold the molding compound in place while the flask is being turned over, as shown in Fig. 2. The pattern, model, or face-plate A is then drawn away and removed, as shown in Fig. 2, leaving the impression of its design in the molding compound S. The flask is then filled on and over the molding compound S with liquid or very soft cement-stone mixture D, as shown in Fig. 3, which is then allowed to set and harden in the flask. If desirable, a facing of very rich and liquid cement-stone mixture may be poured over the surface of the molding compound, as at E in Figs. 3 and 5, and the balance of the mold may then be filled with a thicker or less plastic cement mixture or one having a lesser proportion of cement in the aggregates.

Figure 4:
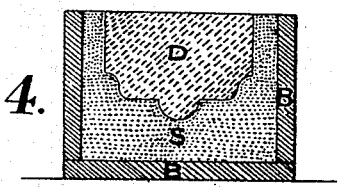

In Fig. 4 is shown a method of embedding the pattern in a box or flask B, having a bottom, the molding compound S being packed not only under or on the downward face of the pattern, but on the sides also, so that all parts of the pattern are in the molding compound, the box or flask merely serving to confine it, the pattern (which may be in one or in several pieces) being drawn from the molding compound the same as in the ordinary process of metal-casting.

Figure 5:
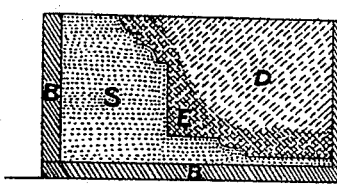

In Fig. 5 one side of the flask forms a side of the stone or block, the other sides thereof being formed in or on the molding compound the same as in Fig. 4.

Figures 6, 7:
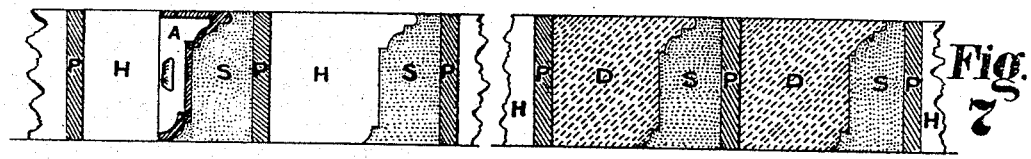
Figure 8:
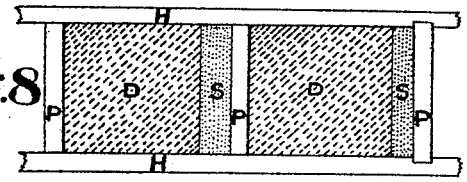

In Figs. 6, 7, and 8 is shown the process of casting stone or blocks where only the face of the block is in contact with the molding compound and where the pattern or face-plate is drawn away from said molding compound horizontally and between parallel boards or planks H. Figs. 6 and 7 are vertical sections, and Fig. 8 is a horizontal or plan view, wherein H H represent two planks set on edge, and P P P are partition-boards to which said planks are nailed or fastened. In each box or section thus formed a stone may be cast. As shown in Fig. 6, A is the pattern or face-plate, which is placed and fastened vertically between the planks at a suitable distance from the partition at the left to give the required width to the block. Then the molding compound S is tamped into the space in front of the pattern, and then the pattern is drawn away from the molding compound and removed, as shown in the right-hand section of Fig. 6. Then the space or mold is filled with the cement mixture D, as shown in Fig. 7. This method permits of the rapid forming of the molds and is particularly suited to the casting of cornice-blocks, water-table blocks, and similar molded forms.

Figure 9:
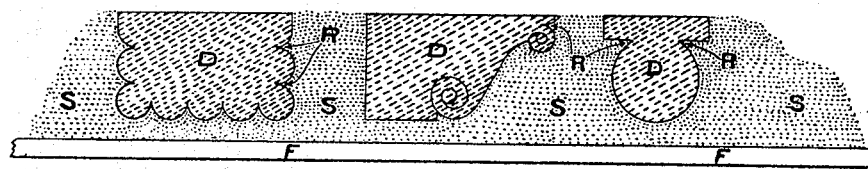

In Fig. 9, F represents a floor over which the molding compound is spread. No flasks or mold-boxes are used to confine the molding compound, which is here packed or tamped around the models or patterns, which are then withdrawn, and the mold is filled with the plastic cement mixture, as is clearly shown in the drawings. In case the design of the core, model, or pattern presents fine details or sharp angles or edges, as shown at R R R in Fig. 9, it has heretofore been found to be difficult or impossible to secure perfect castings of such blocks in sand alone, and the more expensive process of casting in glue or gelatin molds has been used in such cases. The different methods of casting shown in the accompanying drawings or the different methods of forming the molds in which to place the cement mixture are old and of long use and do not enter into the merits of this invention.

The addition of powdered talc or powdered soapstone or of other similar powdered rock substances to the sand or other granular molding material effects the following improvements in the process of manufacturing stone by casting liquid or plastic material in molds:

First. By reason of the white or light color of these powdered mineral substances used in the molding compound and forming a part thereof the surface of the stone is not discolored, as would be the case if ordinary molding-sand were used.

Second. The addition to and as a part of a molding compound of the powdered mineral substances having soapy, sticky, smooth, or slippery properties, such as are possessed by talc and soapstone, forms a perfect substitute for loam and causes the particles of sand to cohere or stand up when slightly moistened, and thus it is possible with such a compound to make clean-cut, sharp, smooth, and perfect molds, such as could not heretofore be made in the sand alone.

Third. The addition of said powdered mineral substances to a molding compound fills the voids between the particles of sand or other granulated material, and thus makes not only a stronger and more self-supporting mold, but also a smoother and more perfect one, especially in the taking and preserving of the fine lines or details of the pattern. It also softens or smoothes the surfaces of the mold and renders the operation of the drawing or removing the model or pattern safer and easier and more expeditious, and, further, it gives to the surface of the finished block a smoother and finer finish.

Fourth. The addition of said powdered mineral substances to a molding compound by filling the voids between the particles of sand with a smooth slippery soapy non-absorbent powder very greatly decreases the absorbent properties of the granulated material, and thus minimizes the absorption of moisture from the plastic cement mixture. By thus minimizing absorption from the block the process of setting is accelerated, the process of crystallization is improved and not interfered with, and the creation of voids due to the absorption of water from the stone is prevented, and thus a stronger, smoother, more dense, more homogeneous, and far more impervious stone is secured. Again, any possible necessity for the use of chemicals to aid in the process of induration or hardening or in alkaline neutralization is done away with and the injurious action of acids on the stone is eliminated.

Fifth. Great economy is effected by the use of the above-described molding compound, for where sand alone is used, as in all former processes, the services of skilled molders is necessary to "touch up" or repair the fragile non-cohesive molding material, whereas by this new process less of such labor is necessary, owing to the more cohesive nature of this molding compound, and finally a better, more valuable, and more salable product may be produced.

Having thus fully described my invention, what I claim as new, and desire to secure by Letters Patent, is—

1. A process consisting of forming or casting artificial stones or blocks of a mixture of Portland cement and aggregates in a liquid or plastic condition, in or on a mold composed of sand mixed with a suitable quantity of powdered talc, or powdered soapstone, or with any other powdered rock having the smooth, soapy, slippery properties common to the powdered rocks above named.

2. A process consisting of forming or casting artificial stones or blocks of liquid or plastic cement material in or on a molding compound composed of sand mixed with a suitable quantity of powdered talc, or powdered soapstone, or with any other powdered rock having the smooth, soapy, slippery properties common to the powdered rocks above named; or mixed with any proper combination of said powdered rock substances.

3. A process consisting of forming or casting artificial stones or blocks of liquid or plastic cement material in or on a mold made up either wholly or in part of a molding compound composed of sand mixed with a suitable quantity of powdered talc, or powdered soapstone, or with any other powdered rock having the smooth, soapy, slippery properties common to the powdered rocks above named; or mixed with any proper combination of said powdered rock substances, as and for the purposes above described.

In testimony whereof I have hereunto subscribed my name in the presence of two subscribing witnesses.

WALTER P. BUTLER.

Witnesses:
CHARLES H. HARRIS,
M. J. SCOTT.